United States Patent Office

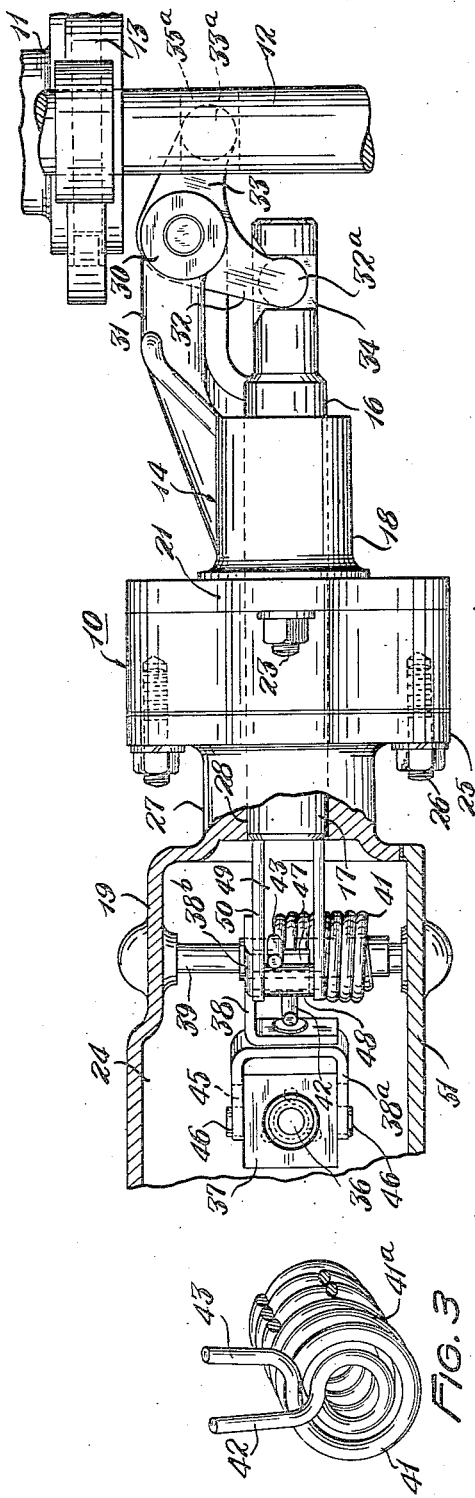

2,821,089
Patented Jan. 28, 1958

1

2,821,089

GEARSHIFT MECHANISM

Robert C. Russell, South Euclid, Ohio., assignor to Eaton Manufacturing Company, Cleveland, Ohio, a corporation of Ohio Application February 4, 1953, Serial No. 335,005

9 Claims. (Cl. 74—335)

This invention relates to shift mechanisms and, more particularly, to a novel construction for a shift mechanism of the type disclosed in my earlier Patent 2,462,779 granted February 22, 1949, in which torsion spring means is employed to form a flexible connection between an actuating means and a movable shift means. The invention is especially suitable for gearshift mechanisms and is disclosed herein as embodied in a mechanism of that kind, but without any intention of limiting the invention solely to that use.

As one of its objects, the invention aims to provide a novel shift mechanism of the above-indicated type embodying means whereby rotary actuating movement is converted into a substantially rectilinear actuating movement which is applied to a longitudinally slidable push rod by the torsion spring means.

Another object is to provide a novel shift mechanism of the character mentioned in which the cooperation of the torsion spring means with the longitudinally slidable push rod accommodates overtravel in either direction as a harmless flexing of the torsion spring means, such that the extreme accuracy heretofore required in the location of the actuating means with respect to the movable shift means, is no longer essential.

Still another object is to provide a novel gearshift mechanism in which a longitudinally slidable push rod cooperates with torsion spring means having a pair of swingable arms, such that a rotary actuating movement effective through the torsion spring means produces a substantially rectilinear push-pull movement of the push rod substantially chordally of the swinging movement of the arms of the spring means.

A further object is to provide a novel gearshift mechanism of the character above mentioned, in which the swinging movement of the arms of the torsion spring means takes place entirely in a plane which includes the longitudinal axis of the push rod.

Additionally, this invention provides a novel gearshift mechanism of the type referred to in which the push rod has a thrust portion adjacent one end thereof and substantially on the longitudinal axis thereof, and relative to which thrust portion the arms of the torsion spring means extend in straddling relation, the thrust portion preferably being a roller means mounted in a forked end portion of the push rod.

The invention can be further briefly summarized as consisting in certain novel combinations and arrangements of parts hereinafter described and particularly set out in the claims hereof.

In the accompanying sheet of drawings, forming a part hereof:

Fig. 1 is a plan view, partially in section, showing a gearshift mechanism embodying this invention;

Fig. 2 is mainly a side elevation of the gearshift mechanism, but with portions thereof shown in vertical section; and Fig. 3 is a perspective view showing the torsion spring in detached relation.

2

As one practical embodiment of this invention, the drawing shows a gearshift mechanism 10 by which a gear member 11 can be shifted between a plurality of predetermined positions. The gear member 11 can, for example and as here shown, be a gear member of a two-speed vehicle axle which is movable between two predetermined gear positions by an axially movable shift member 12 having a fork member 13 thereon and engaging the gear member.

The gearshift mechanism 10 comprises in general, a support structure 14, a motion-converting mechanism 15 and linkage 16 which transmits movement between the motion-converting mechanism 15 and the shift member 12 and which includes a push rod 17.

The support structure 14 can be a unitary structure if desired, but is here shown as comprising a bearing member 18 and a casing member 19. The bearing member 18 comprises a sleeve portion 20 having bushing means 20a therein defining a hollow guideway in which the push rod 17 is axially slidable and flange or lug means 21 by which the bearing member can be connected with an available vehicle portion for mounting the support structure 14 thereon. The flange means 21 of the bearing member 18 is here shown as being connected with a portion of the axle housing 22 by suitable bolts or studs 23.

The casing member 19 forms a housing for the motion-converting mechanism 15 and, for this purpose, is provided with a chamber 24 in which this mechanism is located. The casing member 19 is provided with flange or lug means 25 through which suitable bolts or studs 26 extend for connecting the casing member with the bearing member 18. This casing member 19 also includes a connecting portion 27 which forms a continuation of the sleeve portion 20 of the bearing member 18 and is provided with a guide passage 28 through which the outer end of the push rod 17 extends into the chamber 24.

The gearshift mechanism 10 also includes a power device for supplying the actuating movement and which is shown, in this instance, as being a reversible electric motor 29. The electric motor 29 can be mounted on or connected with the casing member 19 as by having the housing of the motor, or a portion of such housing, formed integral with the casing member.

In addition to the push rod 17, the linkage 16 is here shown as comprising a bell crank lever 30 pivotally mounted in a bracket extension 31 of the support structure 14 and having a pair of angularly disposed lever arms 32 and 33. The arms 32 is connected with the inner end of the push rod 17 by having the rounded end 32a thereof engaged in a transverse slot 34 of the push rod. The arm 33 is connected with the shift member 12 by having a rounded end portion 33a engaged in a transverse slot 35a of the shaft portion of the shift member.

The motion-converting means 15 comprises a pair of cooperating screw and nut members 36 and 37 and an adjacent lever 38 swingably mounted on a pivot shaft 39 which extends across the chamber 24 in a direction transverse to the axis 40 of the push rod 17 and downwardly offset therefrom. The motion-converting means 15 also includes a torsion spring 41 having a helically coiled generally cylindrical body portion 41a disposed around the pivot shaft 39 and a pair of spaced arms 42 and 43 formed by the ends of the helically coiled wire of the spring and extending substantially radially from the pivot shaft.

The screw member 36 is suitably journalled in opposed walls of the casing member 19 so as to extend across the chamber 24 and is connected with, or formed as a part of, the rotary shaft 44 of the driving motor 29. The nut member 37 is supported by the screw member 36 and travels longitudinally therealong during rotation of the screw member. These screw and nut members 36 and 37 can be components of a so-called "ball screw" device which operates with minimum friction to produce longitudinal travel of the nut member in response to rotary movement of the screw member.

The lever 38 comprises a yoke portion 38ª which straddles the nut member 37 and whose yoke arms are provided with recesses 45 in which a pair of projecting pins 46 of the nut member engage. The lever 38 also includes an arm 38ᵇ having an angularly disposed finger portion 47 engaging between the arms 42 and 43 of the torsion spring 41. Swinging of the lever 38 on the pivot shaft 39 in response to travel of the nut member 37 along the screw member 36, causes the angular finger 47 to impart swinging movement to one or the other of the spring arms 42 or 43, depending upon the direction of travel of the nut member along the screw member.

The outer end of the push rod 17 is provided with a thrust member adapted to be engaged by the arms 42 and 43 of the torsion spring 41. This thrust member is preferably in the form of a roller 48 which is mounted in the slot 49 of the forked inner end 50 of the push rod. The arms 42 and 43 of the torsion spring 41 extend in straddling relation to the roller 48, as shown in the drawing, such that during swinging of the lever 38 in a clockwise direction on the pivot shaft 39, the spring arm 42 will apply thrust to the roller 48, and during swinging of the lever 38 in a counterclockwise direction, the spring arm 43 will apply thrust to the roller.

As shown in the drawing, the roller 48 and the arms 42 and 43 of the torsion spring 41, all lie substantially in a vertical plane which includes the longitudinal axis 40 of the push rod 17, such that the thrust of the spring arms on the push rod will always be applied substantially on the axis of this member and will not produce any unbalanced condition tending to cause rotation or transverse lateral displacement of the push rod.

In the operation of the gearshift mechanism 10, the energization of the electric motor 29 causes rotation of the screw member 36 in one direction or the other, depending upon the direction in which the gear member 11 is to be shifted. Let it be assumed that the screw member 36 is rotated in a direction to cause clockwise swinging of the lever 38, as seen in Fig. 2. At the beginning of this swinging movement of the lever 38, the gear member 11 will be in meshed engagement with an adjacent gear member and while load is being transmitted through the meshed gear members, the gear member 11 will tend to remain in such meshed engagement and will offer resistance to movement of the push rod 17 by the motion-converting means 15.

The initial clockwise swinging movement of the lever 38 will, therefore, cause swinging of the spring arm 43 while the spring arm 42 engages the roller 48 and is temporarily held against swinging movement by the resistance of the push rod 17. Such swinging of the spring arm 43, while the arm 42 remains relatively stationary, causes the torsion spring 41 to be stressed, such that when the load being transmitted through the meshed gears is relieved, the gear member 11 will be suddenly shifted by an actuating force supplied by the arm 42 of the torsion spring and transmitted to the shift member 12 through the push rod 17. When the screw member 36 is driven in the opposite direction by the motor 29, the same functioning takes place, but in a reverse direction for shifting the gear member 11 in the opposite direction.

During the above-described operation of the gearshift mechanism 10, the motion-converting means 15 converts the rotary movement of the screw member 36 and of the lever 38 into a rectilinear movement of the push rod 17 and this is accomplished through the action of the torsion spring 41. The cooperation of the swingable spring arms 42 and 43 with the thrust member 48 of the push rod, is such that the thrust member moves substantially chordally of the swinging movement of the spring arms during the conversion of the rotary actuating movement into rectilinear actuating movement.

An important characteristic of this operation is that when the gear member 11 has been shifted to either of its predetermined positions, such that further movement of the push rod 17 is prevented, the torsion spring 41 will readily accommodate and absorb any overtravel of the nut member 37 and of the lever 38 which may occur. This overtravel results merely in some flexing of the torsion spring 41 and produces no harmful effects on the gearshift mechanism. Because of this ability of the cooperation of the torsion spring 41 with the push rod 17 to accommodate and absorb such overtravel, the mechanism need not be made with the extreme accuracy hereof required with respect to the spacing and travel of the outer end of the shift member or linkage with respect to the motion-converting means.

The casing member 19 of the support structure 14 preferably includes a cover section 51 by which lubricant can be retained in the chamber 24 for lubricating the various parts of the motion-converting means 15. Leakage of such lubricant out of the chamber 24 around the push rod 17 is prevented with a suitable packing ring 52.

From the accompanying drawing and the foregoing detailed description, it will now be readily understood that this invention provides a novel gearshift mechanism of a very simple and practical form in which rotary or swinging movement is converted to rectilinear movement by cooperation of a torsion spring means with the thrust member of a slidable push rod, such that overtravel in either direction will be readily accommodated by the torsion spring means without any harmful effect being produced on the mechanism and without need for extreme accuracy in manufacture and assembly of the gearshift mechanism.

Although the novel gearshift mechanism of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a shift mechanism for moving a part between two positions, a support, an actuating member mounted on said support for swinging movement, means effective to impart swinging movement to said actuating member, linkage engageable with said part and including a rod axially slidable in said support with its outer end adjacent said actuating member, and torsion spring means forming a yieldable thrust applying connection between said actuating member and said rod, said rod having a thrust member on said outer end and said spring means having a pair of spaced arms in straddling relation to said thrust member.

2. In a shift mechanism for moving a part between two positions, a support, an actuating member mounted on said support for swinging movement, means effective to impart swinging movement to said actuating member, linkage engageable with said part including an axially movable rod having a thrust member disposed adjacent said actuating member and located substantially on the axis of the rod, torsion spring means forming a yieldable push-pull connection between said actuating member and said rod and having spaced apart swingable arms straddling said thrust member, and guide means on said support confining said rod for axial sliding movement such that the travel of said thrust member is a substantially chordal movement with respect to the swinging of said arms.

3. In a gearshift mechanism, a support having guide sleeve means thereon, motion-converting means mounted on said support and operable to convert alternating rotary actuating movement into a push-pull substantially rectilinear actuating movement, and movable shift means responsive to said motion-converting means and engageable with a gear to be shifted, said motion-converting means comprising torsion spring means having a pair of arms swingable substantially in a plane which includes the longitudinal axis of said sleeve means and a push rod longitudinally slidable in said sleeve means and having thrust means thereon adjacent the outer end thereof and engaged by said arms in straddling relation thereto.

4. In a gearshift mechanism, a support having guide sleeve means thereon, motion-converting means operable to convert alternating rotary actuating movement into a push-pull substantially rectilinear actuating movement, movable shift means responsive to said motion-converting means and engageable with a gear to be shifted, said motion-converting means comprising a push rod longitudinally slidable in said sleeve means and having a forked outer end and torsion spring means having a pair of arms swingable substantially in a plane which includes the longitudinal axis of said push rod, and roller means in said forked end and relative to which roller means said arms extend in straddling relation thereto.

5. In a gearshift mechanism, a mounting structure including hollow longitudinal guide means and wall means defining a chamber adjacent one end of said guide means, motion-converting means operable to convert alternating rotary actuating movement into substantially rectilinear actuating movement, movable shift means engageable with a gear to be shifted, said motion-converting means comprising a push rod longitudinally slidable in said guide means and having a forked end projecting into said chamber and torsion spring means pivotally supported in said chamber and having a pair of swingable arms, and a roller in said forked end and relative to which roller said arms extend in straddling relation.

6. In a gearshift mechanism, a mounting structure including hollow longitudinal guide means and wall means defining a chamber adjacent one end of said guide means, a pivot shaft in said chamber extending in transverse relation to and offset from the longitudinal axis of said guide means, a torsion spring having a coiled portion disposed around said shaft and a pair of spaced substantially radial arms, actuating means in said chamber including a lever pivoted on said shaft and having a finger portion engaging between said arms, movable shift means engageable with a gear to be shifted and including a push rod longitudinally slidable in said guide means and having its outer end extending into said chamber, and a thrust element on said outer end and relative to which element said arms extend in straddling relation.

7. In gearshift mechanism, a support structure having a guideway thereon, a rod reciprocably movable in said guideway, linkage effective between one end of said rod and a part to be shifted for transmitting motion to the latter, a screw rotatable in said structure about an axis extending transverse to the axis of said guideway, a reversible rotary motor connected with said screw to drive the same alternately in opposite directions, a nut movable along said screw, a lever pivoted on said structure and swingable by said nut, and torsion spring means forming a direct but flexible connection between said lever and the other end of said rod for converting the swinging movement of said lever into the reciprocating movement of said rod.

8. Gearshift mechanism as defined in claim 7 in which the axes of said rod and screw lie in a common plane and are substantially normal to each other.

9. In gearshift mechanism, a support structure having a guideway thereon, a rod reciprocably movable in said guideway, linkage effective between one end of said rod and a part to be shifted for transmitting motion to the latter, a screw rotatable in said structure about an axis extending transverse to the axis of said guideway, a reversible rotary motor connected with said screw to drive the same alternately in opposite directions, a nut movable along said screw, a torsion spring, and a single lever swingable by said nut and directly and flexibly connected with the other end of said rod through said torsion spring.

References Cited in the file of this patent

UNITED STATES PATENTS

| 2,019,073 | Cooper | Oct. 29, 1935 |
| 2,649,813 | Barth | Aug. 25, 1953 |
| 2,657,585 | Williams | Nov. 3, 1953 |